(12) United States Patent
Fuehrer et al.

(10) Patent No.: US 7,228,450 B2
(45) Date of Patent: Jun. 5, 2007

(54) METHOD AND DEVICE FOR THE FORMATION OF CLOCK PULSES IN A BUS SYSTEM HAVING AT LEAST ONE STATION, BUS SYSTEM AND STATION

(75) Inventors: Thomas Fuehrer, Gerlingen (DE); Bernd Mueller, Leonberg (DE); Florian Hartwich, Reutlingen (DE); Robert Hugel, Karlsruhe (DE)

(73) Assignee: Robert Bosch GmbH, Stuttgart (DE)

( * ) Notice: Subject to any disclaimer, the term of this patent is extended or adjusted under 35 U.S.C. 154(b) by 381 days.

(21) Appl. No.: 10/471,908

(22) PCT Filed: Mar. 13, 2002

(86) PCT No.: PCT/DE02/00873

§ 371 (c)(1),
(2), (4) Date: Mar. 22, 2004

(87) PCT Pub. No.: WO02/075993

PCT Pub. Date: Sep. 26, 2002

(65) Prior Publication Data

US 2004/0148540 A1  Jul. 29, 2004

(30) Foreign Application Priority Data

Mar. 15, 2001 (DE) ............................... 101 12 907
Feb. 28, 2002 (DE) ............................... 102 08 649

(51) Int. Cl.
G06F 1/06 (2006.01)
(52) U.S. Cl. ........................................ 713/500; 377/48
(58) Field of Classification Search ................ 713/500; 377/48
See application file for complete search history.

(56) References Cited

U.S. PATENT DOCUMENTS

| | | | | |
|---|---|---|---|---|
| 5,202,642 A * | 4/1993 | Dixon | ........................ | 327/105 |
| 5,436,628 A * | 7/1995 | Liepold | ...................... | 341/110 |
| 5,907,590 A * | 5/1999 | Mogi | ........................... | 377/48 |
| 6,249,235 B1 * | 6/2001 | Iwasaki | ...................... | 341/123 |
| 6,557,133 B1 * | 4/2003 | Gomes | ........................ | 714/738 |

FOREIGN PATENT DOCUMENTS

| | | |
|---|---|---|
| DE | 100 00 302 | 7/2001 |
| DE | 100 00 303 | 7/2001 |
| DE | 100 00 304 | 7/2001 |
| DE | 100 00 305 | 7/2001 |

\* cited by examiner

*Primary Examiner*—Chun Cao
*Assistant Examiner*—Vincent Tran
(74) *Attorney, Agent, or Firm*—Kenyon & Kenyon LLP

(57) ABSTRACT

A method for forming clock pulses of a second clock cycle (AT, TT) from clock pulses of a specified first clock cycle (ET) in a bus system having at least one user, a first number (E) of the clock pulses of the first clock cycle being determined or specified in a specifiable time interval and a second number (A) of the clock pulses of the second clock cycle being determined or specified in the specifiable time interval, in which an intermediate value (R) of the number of clock pulses is specified in the specifiable time interval, and the intermediate value (R) is compared to a value (C) which is formed from the first number (E) of clock pulses and the second number (A) of clock pulses and from the comparison a truth value (TRUE, FALSE) is yielded, and a clock pulse of the second clock cycle (AT, TT) is generated as a function of the truth value (TRUE, FALSE).

13 Claims, 5 Drawing Sheets ately, the subject matter of the present invention provides a method, a device or a corresponding bus system
METHOD AND DEVICE FOR THE FORMATION OF CLOCK PULSES IN A BUS SYSTEM HAVING AT LEAST ONE STATION, BUS SYSTEM AND STATION

FIELD OF INVENTION

The present invention relates to a method and a device for forming clock pulses in a bus system having at least one user, as well as to a bus system and a user of the bus system.

BACKGROUND INFORMATION

The networking of control units, sensor systems and actuator systems with the aid of a communications system, that is, a bus system, has increased in recent years in the construction of modern motor vehicles and in machine construction, especially in the field of machine tools and in automation. In this context, synergies from the distribution of functions to several control units can be achieved. These are called distributed systems. The communication between various users of such distributed systems is occurring more and more via a bus or a bus system. The communications traffic on the bus system, access and reception mechanisms, as well as error handling are governed via a protocol.

In the automotive field, an established protocol is the CAN (controller area network). This is an event-driven protocol, i.e. protocol activities such as sending a message are initiated by events which have their origin outside the communications system itself. Unique access to the communications system or bus system is solved by a priority-based bit arbitration. The presupposition for this is that a unique priority is assigned to each message. The CAN protocol is very flexible. When using it, the addition of additional nodes and messages is possible without a problem, as long as there are still free priorities (message identifiers).

An alternative approach to such an event-controlled, spontaneous communication is the purely time-controlled approach. All communications activities on the bus are strictly periodic. Protocol activities such as sending a message are triggered only by progress in time valid for the entire bus system. Access to the medium is based on the apportionment of time periods during which a user has an exclusive transmission right. Such a protocol is comparatively inflexible. Adding new nodes is possible when the respective time periods were left free ahead of time. This circumstance makes it necessary already to fix the message sequence before initial operation. Thus, a timetable is drawn up which has to meet the demands of the message requirements with respect to rate of repetition, redundancy, deadlines, etc. The positioning of the messages within the transmission periods must be matched to the applications which produce the message contents, in order to hold the latency between application and point of transmission time to a minimum. If this matching does not take place, the advantage of the time-controlled transmission (minimal latent jitter when sending the message on the bus) is lost. Thus, stringent requirements are placed on the planning tools.

The attempt at an approach, as described in German Patent Applications Nos. 100 00 302, 100 00 303, 100 00 304 and 100 00 305, of the time-controlled CAN, of the so-called TTCAN (time-triggered controller area network) satisfies the requirements outlined above for time-controlled communications, as well as the requirements for a certain degree of flexibility. TTCAN fulfills this by setting up the basic cycle into so-called exclusive time windows for periodic messages of certain communications users and into so-called arbitrating time windows for the spontaneous messages of several communications users.

Besides the bus systems mentioned, a plurality of bus or communications systems for connecting users in distributed systems is available. Subsequently, a starting print is from a TTCAN network as the bus system having at least one user, where this should not be understood as restrictive with respect to the later subject matter of the present invention. Rather, the subject matter of the exemplary embodiments of the present invention described herein may be used also for further comparable bus systems for forming a pulse or clock pulse or pulse division.

In this context, for example, in networked control units in automation, in motor vehicles and in other fields of application, a uniform clock pulse must be derived from the various internal, local clock pulses of the users, especially of the control units for the communications network, that is, the bus system. Likewise, in the networked control units named, an internal, local clock cycle of each user must be derivable, for instance as working clock cycle, from one clock cycle transmitted via the bus system or the communications network.

Customary pulse scalers allow for deriving a slower output clock cycle from an input clock cycle, the clock cycle period of the output clock cycle being an integral multiple of the clock cycle period of the input clock cycle.

SUMMARY OF THE INVENTION

Consequently, the subject matter of the present invention provides a method, a device or a corresponding bus system and a corresponding user, whereby, using pulse scaling, a slower output clock cycle may be produced from an input clock cycle, the clock cycle period of the output clock cycle not only being able to be an integral multiple of the clock cycle period of the input clock cycle, but on average also a fractional rational multiple.

The subject matter of the present invention provides a method, as well as a device and a corresponding bus system, as well as a user of the bus system, for forming pulses of a second clock pulse from pulses of a specified first clock pulse, a first number of pulses of the first clock pulse being ascertained in a specifiable time interval or being specified, and a second number of the pulses of the second clock pulse being ascertained or specified in the specified time interval; advantageously, an intermediate value of the number of pulses being specified in the specifiable time interval, and the intermediate value being compared to a value which is formed from the first number of pulses and the second number of pulses, and a truth value being derived from the comparison; as a function of the truth value, a clock pulse of the second clock cycle being produced.

According to the exemplary embodiment and/or method of the present invention, a pulse scaling or a formation of a clock cycle is thereby achieved so that not only an integral, but on average also a fractional rational multiple of the clock cycle period of the input clock cycle, or rather, the first clock cycle, may be achieved.

In one embodiment, advantageously, besides the intermediate value, a scaling intermediate value is specified, which is compared to a specified scaling value, and an additional truth value comes about from the comparison with the scaling value, a clock pulse of a third clock cycle being producible from the clock pulse of the second clock cycle, as a function of the additional truth value.

This allows for obtaining a finer resolution of the output clock cycle period, that is, the clock cycle period of the second and/or third clock cycle than in the known methods.

Furthermore, it is of advantage that, by the measures described herein, a more accurate setting of the clock cycle to be formed comes about, especially of the network clock cycle, even when the input clock cycle, in particular the local clock cycles of the users deviate from their setpoint values, for instance by temperature change or temperature deterioration. The same also applies to the example of a more exact setting of the local clock cycles of the users, particularly of the at least one user, from an input clock cycle of the bus system, especially of the network clock cycle.

The above-described method steps are expediently run through once as a function of each clocked pulse of the clock cycle.

Advantageously, the intermediate value is changed differently, as a function of the comparison and thus as a function of the truth value.

In one embodiment, the production of the clock pulse of the second clock cycle and/or the third clock cycle and the change of the intermediate value or the scaling intermediate value is reset by a specifiable number of clock pulses of the first clock cycle.

In an expedient manner, the value to which the intermediate value is compared results from the subtraction of the product of the second number of clock pulses, that is the pulses of the second clock cycle, and an integer F of the first number of clock pulses of the first clock cycle in the specifiable time interval.

In particular, in the specific embodiment, a clock pulse of the second clock cycle and/or the third clock cycle is generated when the condition is satisfied that the above-named intermediate value is greater than the aforesaid subtraction result.

In another exemplary embodiment, the integer F is limited to values of $2^n$, where $n \in N_0$, so that the multiplication of the number of the clockpulses of the second clock cycle by the whole number may be replaced by a shift of the binary value of the number of clock pulses of the second clock cycle by n bits. Thereby, the method can do without multiplication or division, which may require a great deal of implementation expenditure.

During generation of the clock pulses of the third clock cycle, the clock pulses of the second clock cycle are advantageously only available within the user itself, but are not output by it.

BRIEF DESCRIPTIONS OF THE DRAWINGS

DETAILED DESCRIPTION

Figure 1:
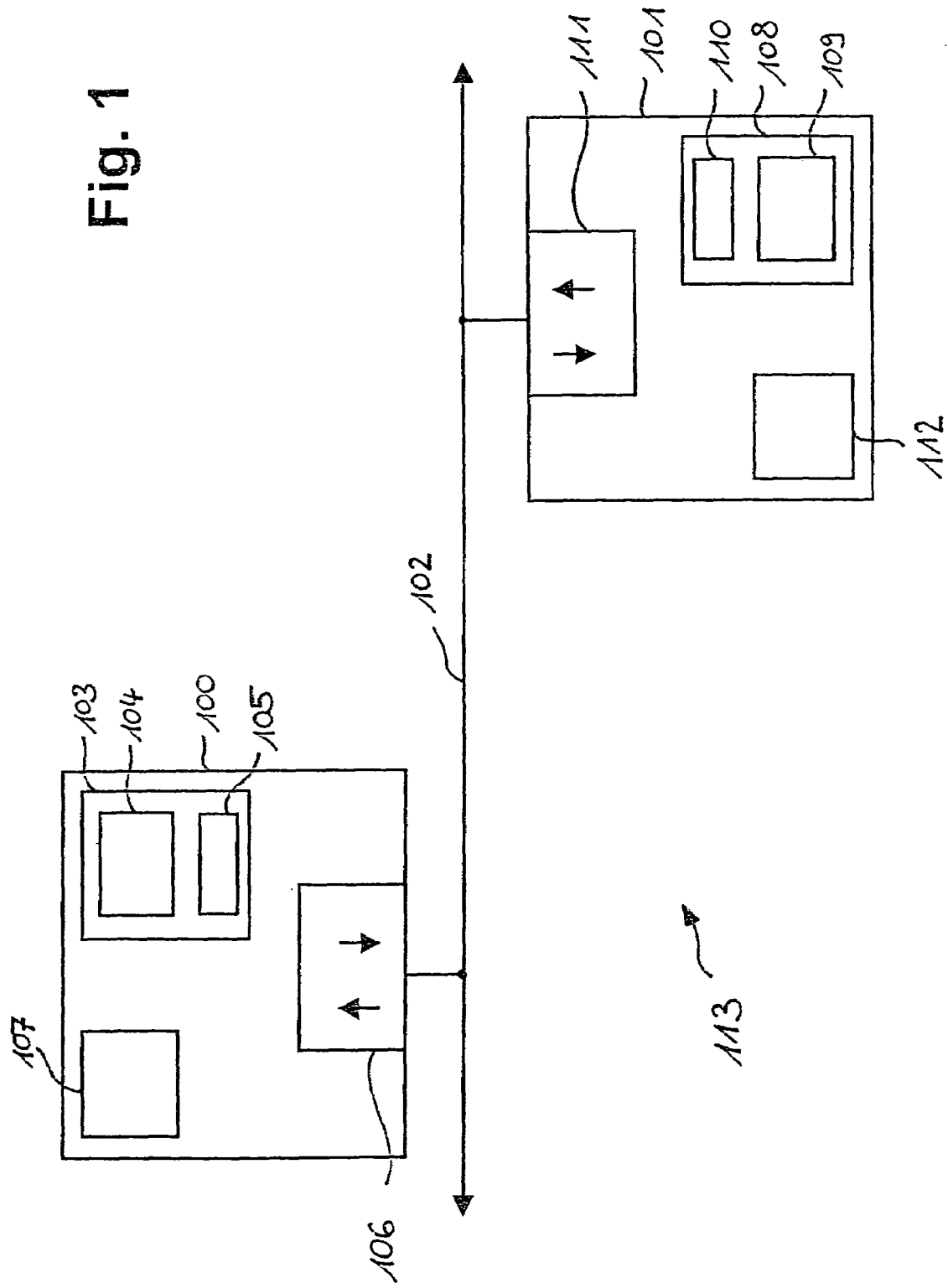
FIG. 1 shows a network or a bus system having at least one user, especially a TTCAN bus system having at least one arrangement for carrying out the method according to the present invention.

FIG. 1 shows a bus system 113 having a first user 100 and a second user 101, which are connected to each other via a communications connection 102. In the users, 103 and 108 each shows a bus control module, a so-called bus controller. The two communications interfaces 106 and 111, as connection to communications connection 102 are here shown separately, but they may also be accommodated in bus controller 103 and 108, or their functionality may be assumed by bus controller 103 and 108. In users 100 and 101, clock sources 107 and 112 are shown. Bus controllers 103 and 108 include the pulse scaler, or rather, the functionality of pulse scaling, shown by block 104 and block 109. In this context, depending on whether adjustment is necessary, the local clock cycle is adjusted to a common clock cycle of bus system 113, or a common clock cycle of bus system 113 is transmitted to the appropriate user via communications connection 102. A local time base is optionally present, such as a counter module, especially when it comes to TTCAN, which is shown here by 105 and 110.

Since, as was described, both directions of adjustment are possible, from here on, an input clock cycle and an output clock cycle, or a scaled clock cycle or an output scaled clock cycle are referred to. In particular, the adjustment of the clock cycle of a timing generator external to the communications connection as supply clock cycle (quartz, voltage-controlled oscillator, etc), especially of the given clock source 107 and 112 takes place to a common working clock cycle of the bus system via the bus controller. For this, the pulse scaler is used, for example, an integrated circuit, an IC 104 and 109.

The desired time unit ratio is established by the quotient of the number of input clock cycles in a given, especially large, time interval and the number of output clock cycles in the same time interval, these numbers E and A being integers. Thus, a time unit ratio TUR is given by $$TUR = E/A \quad \text{(equation 1)}$$

Consequently, TUR is a rational number. The length of a single output clock cycle period ATP is always an integral multiple of the length of the input clock cycle period, the following equation holding true:

$$((TUR-0.5)*ETP) < ATP < ((TUR+0.5)*ETP) \quad \text{(equation 2)}$$

This means that the length of any two ATP's differs by maximally one ETP. Consequently, on average, $$ATP = TUR*ETP \quad \text{(equation 3)}$$

holds.

If the output clock cycle period ATP is subdivided more finely, the individual parts of output pulse period ATP may be of different lengths by one input clock cycle period ETP. For the possible resolution of scaling F it is true that $$F \leq TUR \quad \text{(equation 4)}$$

holds, F being an integer. Fine division F means that an output pulse period ATP is subdivided into F parts.

The clock cycle formation, especially the pulse cycle scaling, according to the present invention is now based on the idea that the division by A, that is, the time unit ratio TUR, according to equation 1, is replaced by an algorithm in such a way that for the condition $$N*A-E=R \geq 0 \qquad \text{(equation 5)}$$

the minimum value of N is able to be calculated. Consequently, this yields the length of an output clock cycle period ATP as N times the input clock cycle period ETP.

Figure 2:
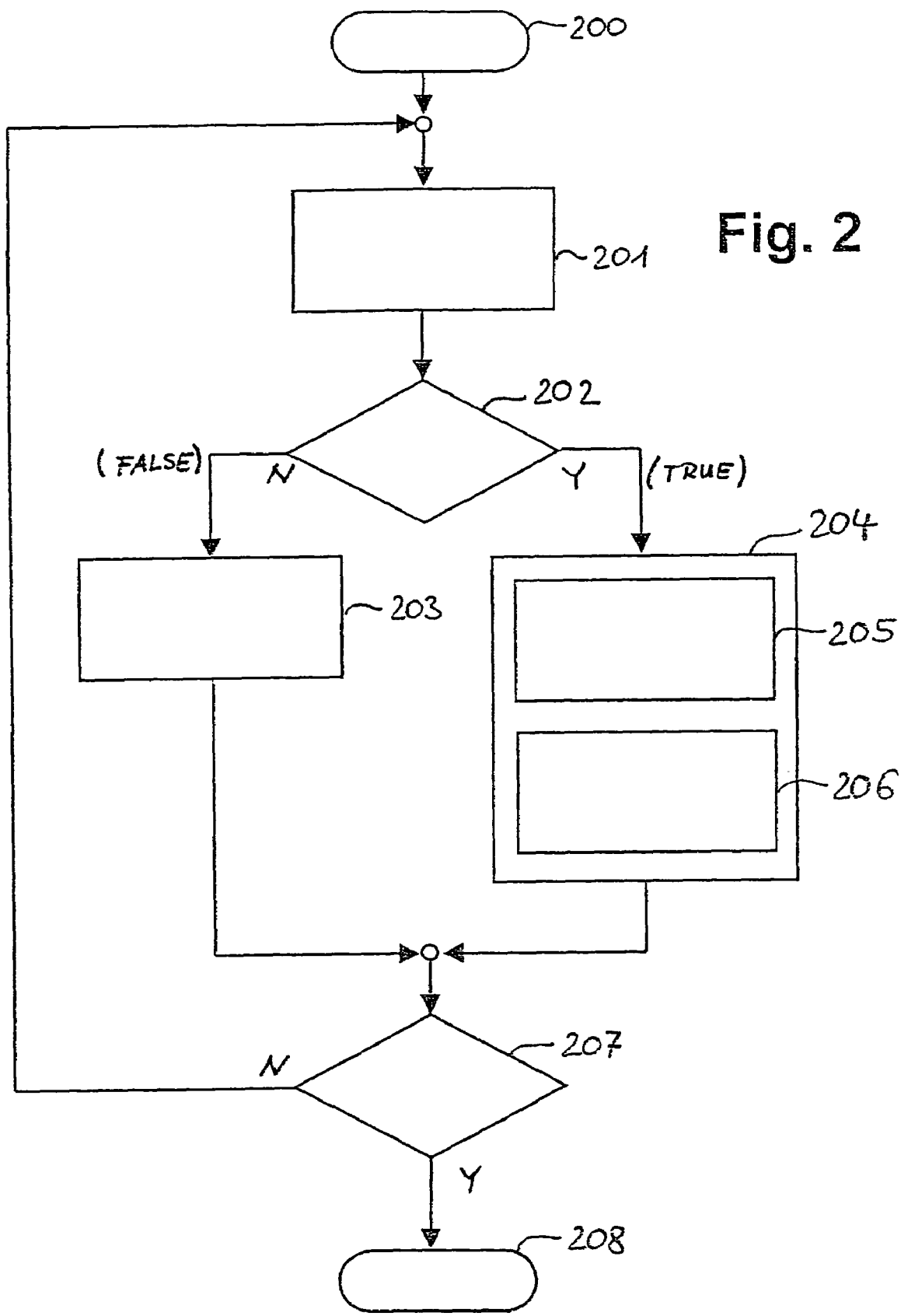
FIG. 2 shows a flow diagram on pulse cycle formation, in particular pulse scaling, the integer F being selected to be equal to 1, and for comparison an intermediate value is specified.

The remainders R added from one output clock cycle period ATP to the next, which is shown next in a simple method according to FIG. 2. In this context, E and A are integers having a time unit ratio $$TUR=E/A \geq 1 \qquad \text{(equation 6).}$$

The remainder R, subsequently referred to as intermediate value, is also an integer and begins, for example, at 0. The beginning of the method is shown in block 200 of FIG. 2. In block 201, the input clock pulses are evaluated to the extent that, for each input clock pulse, the subsequent process runs. Query 202 checks whether intermediate quantity R is greater than the difference E−A, thus, whether intermediate quantity R is greater than the difference of the number of input clock cycles minus the number of output clock cycles.

$$(R>E-A) \qquad \text{(equation 7)}$$

If this is the case, block 204 is reached, in which, on the one hand, in block 205 a new intermediate value R is generated or intermediate value R is changed, and in block 206 a clock pulse of output clock cycle AT is generated.

According to the equation $$R:=R+A-E \qquad \text{(equation 8)}$$

intermediate value R is changed. In block 206 an output clock pulse is now generated. Consequently, for each clock pulse of input clock cycle ET a clock pulse of output clock cycle AT is generated, provided the condition as in equation 7 (R>E−A) is satisfied. If this condition is not satisfied, the system reaches block 203 from block 202, where there also takes place an adjustment or change of intermediate value R, in that $$R:=R+A \qquad \text{(equation 9)}$$

is calculated. From block 204, after the generation of the clock pulse of output clock cycle AT and the change of intermediate quantity R according to block 205 or from the different change of intermediate quantity R in block 203, the system reaches block 207, in which is decided whether the method is to be carried further or the clock cycle adjustment is to be ended. If this is the case, the system reaches block 208, the end of the method, or in the other case, it goes back to block 201, where the renewed clock pulse of input clock cycle ET is evaluated. In this context, the termination condition after query 207 is optional, and does not have to be included.

According to the exemplary embodiment and/or method of the present invention, there are other, equivalent algorithms or methods in which a corresponding clock cycle formation or pulse scaling is achieved, for instance by, instead of increasing R by A until an output pulse condition is satisfied, the intermediate value R is reduced until a further query condition is satisfied. All these equivalent algorithms according to the present invention have the following scheme in common:

During the application, there is a process which runs once at each clock pulse of input clock cycle ET (evaluation block 201).

This process is able to generate a clock pulse of output clock cycle AT (corresponding to block 204 and 206).

The clock pulse of output clock cycle AT is generated when the comparison of intermediate value R to an easily calculable fixed value determined from E and A yields a certain truth value. Thus, in the previous example, a truth value TRUE is yielded from block 202 upon satisfaction of the condition R>E−A according to equation 7, which results in a first change of intermediate value R according to block 205 and the initiation of a clock pulse of output clock cycle AT according to block 206. In the case of a second truth value FALSE, i.e. when the condition R>E−A according to equation 7 is not satisfied, intermediate value R is adjusted in a different manner according to block 203, and no clock pulse of the output clock cycle is generated.

Consequently, if a clock pulse of output clock cycle AT is generated, a certain first manipulation M1 is undertaken with R, for instance, an addition or subtraction of a value that is calculable from A and E.

If no clock pulse of output clock cycle AT is generated, a certain other manipulation M2 is undertaken with R, just as here, for example, the addition of A.

As a variant of this method or approach, the step of generating the clock pulse of the output clock cycle and manipulation M1 of intermediate value R may be split up in such a way that the output of the clock pulse of output clock cycle AT and manipulation M1 of intermediate value R do not occur simultaneously, but are offset by a specifiable number, in particular, a fixed number of clock pulses of input clock cycle ET.

A further optional variant is that the certain further manipulation M2 with intermediate value R is always executed, and in the previous step, that is, in case a clock pulse of output clock cycle AT is generated, only the difference with respect to manipulation M1 compared to this manipulation M2 is still set in addition.

Figure 3:
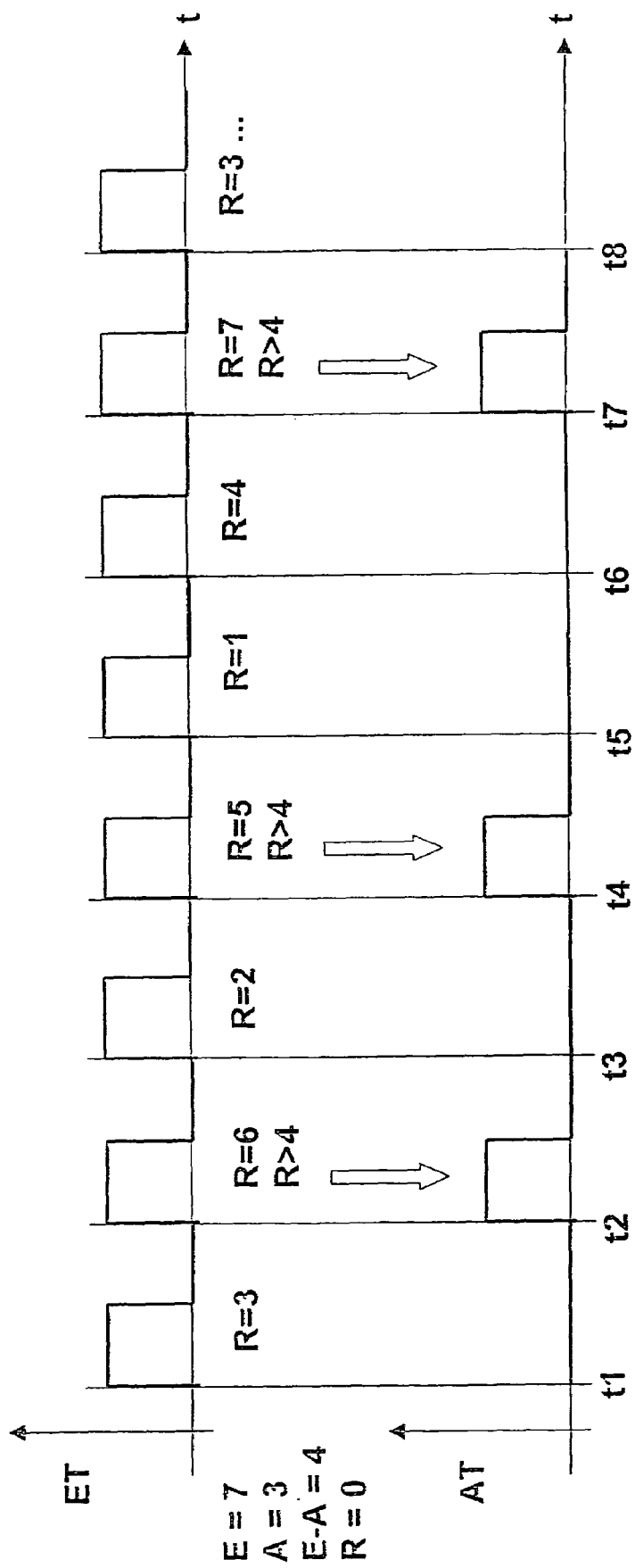
FIG. 3 shows a representation of signals of the clock pulses, to explain the procedures according to the flow diagram in FIG. 2.

A concrete example to illustrate the method just described is shown in FIG. 3. This shows the number of clock pulses of input clock cycle ET, E at 7, and the number of clock pulses of output clock cycle AT, A in the same time interval at 3. Consequently, this yields a difference of E−A equals 4. As was mentioned before in exemplary fashion, intermediate value R starts, in particular, at 0. The first clock pulse of input clock cycle is not shown, because it is only valid for the starting values. Thus, for this first input clock cycle, R<4 applies, whereby truth value FALSE is generated, and in block 203, with R:=R+A=3, intermediate value R has 3 allocated to it. At the next clock pulse of input clock cycle ET at T1, R thus=3. Once again, R<4. The truth value FALSE is again generated, and in block 203 A=3 is added. That makes R=6. At the next clock pulse at time T2, thus R=6, so that R>4, whereby truth value TRUE is generated. In block 205 the new value for R is formed. With R:=R+A−E=2 and block 206 an output clock pulse is then generated. At time T3, consequently, R=2, and no output clock pulse is generated. But in block 203 the new value is determined by truth value FALSE, which yields R=5. Thus, at point T4, for R=5 a clock pulse of output clock cycle AT is generated anew. At point T5 and T6, via block 203 and corresponding to truth values FALSE, the new R values are determined with R=1 at T5 and R=4 at T6. The next output clock cycle is then generated for R=7 with R>4 at point T7. Beginning at T8, the method steps repeat beginning with R=3, as shown.

In this example, as points in time T1 the rising sides of the clock pulses of the input clock cycle have been picked. This is not essential. Equal results may be carried out for the lowering sides or other recognizable states of the clock pulses of the input clock cycle. Consequently, at points T2, T4 and T7 clock pulses of the output clock cycle are generated. Consequently, a fractional rational time unit ratio may be shown here, such as TUR=7/3=2⅓, which then simply means two to three clock pulses of output clock cycle AT, with respect to input clock pulses.

For starting value R, for instance, a register value, stored in a register in a user, particularly in the controller, any number of values is possible. If R is drawn from a register, a starting value of 0 is available, since it is easily achievable in the register by a reset, particularly a power-on reset, and no further adjustment is necessary. The only prerequisite with respect to the values E and A is that E≧A, in other words, the numerator of time unit ratio TUR is greater than the denominator, which means that from a faster input clock cycle a slower output clock cycle is formed. Other than that, E and A may be selected at will.

In one embodiment, the exemplary method according to the present invention is extended to the extent that a scaling of the clock pulses of output clock cycle AT is achieved. The number of clock pulses of input clock cycle E and the number of clock pulses of output clock cycle A are again integers, although this time having a time unit ratio $$TUR=E/A \geq 2 \quad \text{(equation 10)}$$

and F as an integer, with F≦time unit ratio TUR(F≦TUR). Besides intermediate value R, an additional intermediate value, a scaling intermediate value T is introduced, which is an integer just as R is, and in this example also starts at 0.

Figure 4:
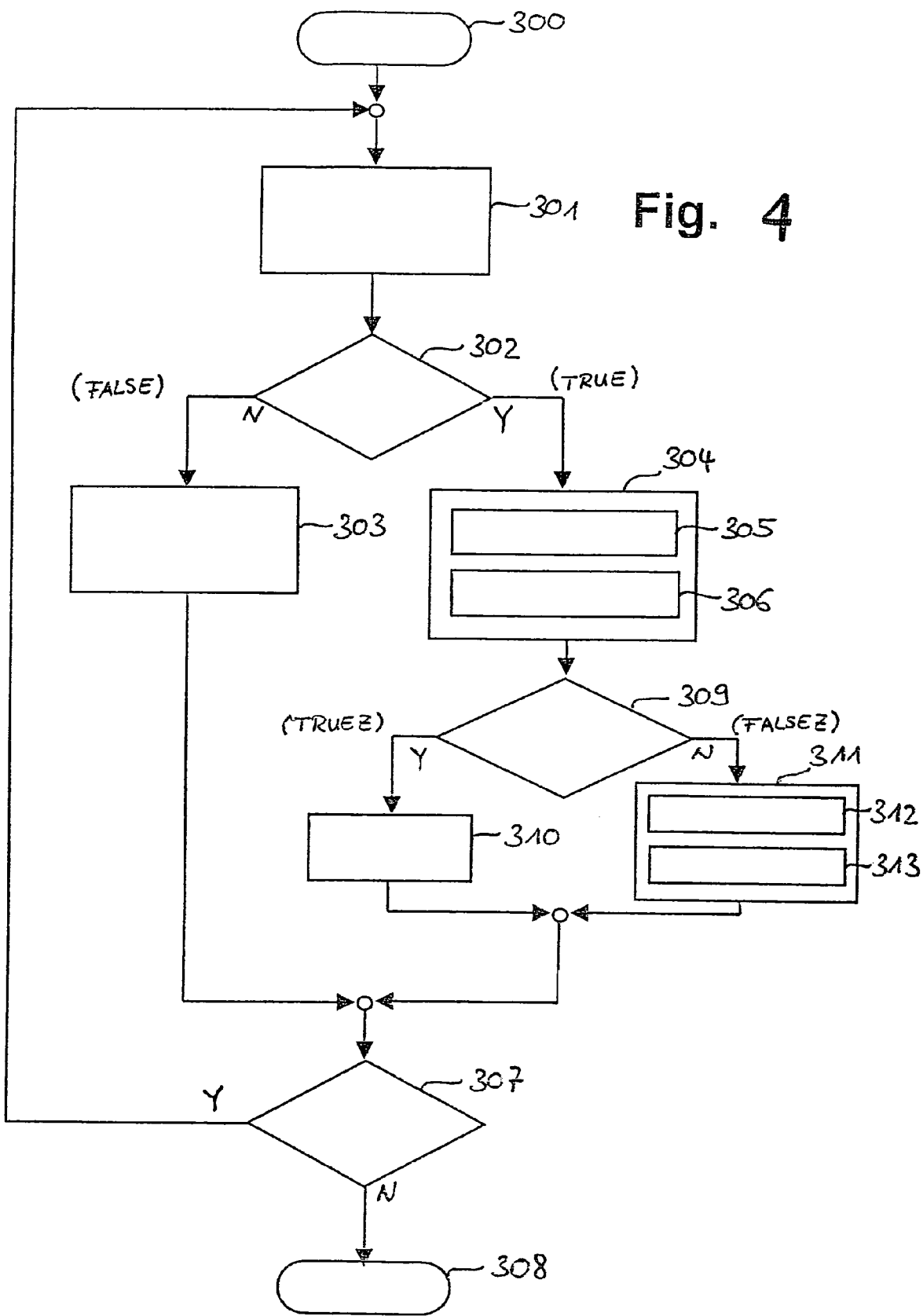
FIG. 4 shows a flow diagram corresponding to FIG. 2, where additionally, besides the intermediate value, a scaling intermediate value is specified, and corresponding second and third clock cycles are generated from the first clock cycle.

FIG. 4 shows the extension of the exemplary method according to the present invention. The method starts in block 300. In block 301, comparably as in FIG. 2, the clock pulses of input clock cycle ET are evaluated, at each input clock pulse the following process being run. In query 302 a check is made as to whether $$R>E-A*F \quad \text{(equation 11)}$$

holds. If this is not satisfied, this yields a truth value FALSE, the system reaches block 303, where R is again adjusted, and this according to $$R:=R+A*F \quad \text{(equation 12).}$$

However, if the condition according to equation 11 in block 302 is satisfied, this then yields a truth value TRUE, and the system reaches block 304. In that block, on the one hand, in block 305 intermediate value R is adjusted according to:

$$R:=R+A*F-E \quad \text{(equation 13)}$$

At the same time, or, as will be described later in a variant, offset to it, in block 306 a scaled clock pulse, that is, a clock pulse of a scaled clock cycle TT is now generated, comparably to the clock pulse of output clock cycle AT of the previous example. Consequently, up to this point, the extension corresponds to the aforesaid example, F being selected=1 in the previously described example. But now scaled intermediate value T is checked in block 309, in fact according to the condition $$T<F \quad \text{(equation 14)}$$

Corresponding to this condition, this now yields an additional truth value TRUEZ or FALSEZ. If the condition T<F is satisfied, truth value TRUEZ comes about, and the system reaches block 310, where T is incremented, that is, $$T:=T+1 \quad \text{(equation 15)}$$

If the condition T<F in block 309 according to equation 14 is not satisfied, this then yields a truth value FALSEZ, and the system reaches block 311. Here, on the one hand, in block 312 partial intermediate value T is reset, that is, $$T:=0 \quad \text{(equation 16)}$$

and, on the other hand, in block 313 a clock pulse of a third clock cycle of output scaled clock cycle ATT is generated.

This now may occur as in block 304 or in the preceding example too, essentially simultaneously, or offset in time.

From block 303, 310 and 311 the system now comes to query 307, where it is only checked whether the method should be maintained further or is to be maintained. If yes, the system again reaches block 301, where the next clock pulse of the input clock cycle is evaluated. If the method is ended, for example, according to a time condition or because, over a specifiable time period no clock pulses of input clock cycle ET were detected, etc, the system reaches block 308, the end of the method. Here too, the termination condition is optional.

Consequently, in accordance with the method described above, a scaled pulse of scaled timing TT, that is, of the second clock cycle here in this exemplary embodiment, is generated in accordance with block 304 and 306, and in fact for each clock pulse of input clock cycle ET, for which the condition according to equation 11 (R>E−A*F) is satisfied.

Equally, a clock pulse of an output clock cycle, here the clock pulse of the third clock cycle, of the output scaled clock cycle ATT, according to block 311, especially 313, is generated for each clock pulse of scaled clock cycle TT for which scaled intermediate value T assumes a certain value. This value may be selected or specified, and may be 0, for example. That is, the clock pulse of output scaled clock cycle ATT is generated for each clock pulse of scaled clock cycle TT, for example, when T changes from F−1 to 0.

In one special specific embodiment, F may be limited to values of $2^n$, where n∈N, so that the multiplication A*F may be replaced by a shifting of A by n bits (to the left or right, depending on system conditions). Here too, there are comparable algorithms, and the more general scheme may be described as follows:

During the application, there is a process which runs once at each clock pulse of input clock cycle ET. This is evaluated in the example in block 301.

This process is able to generate a clock pulse for a scaled pulse TT for the subdivisions and possibly also clock pulses for the full output clock cycle, here as output scaled pulse ATT.

Scaled clock pulse TTP, or the clock pulse of scaled clock cycle TT is generated when the comparison of an intermediate variable or the intermediate variable R with a fixed value C which is simple to calculate from E and A, particularly also in hardware, yields a certain truth value TRUE or FALSE. In the example, this occurs corresponding to query 302 and block 304.

If a scaled clock pulse TTP, that is, a clock pulse of scaled clock cycle TT, is generated, again a certain manipulation, here a third manipulation M3 is undertaken with intermediate value R, such as was done before with addition and subtraction of a value calculable from A and E, according to block 305.

The clock pulse of output scaled timing ATT may be generated if the comparison of a further intermediate variable or the scaled intermediate value T having a fixed scaled value TC yields an additional truth value TRUEZ or FALSEZ. In this context, scaled intermediate value T is able to count, for example, scaled clock pulse TTP, that is, the clock pulses of scaled clock cycle TT.

If a clock pulse of output scaled clock cycle ATT is generated, a further, specifiable manipulation M4 is undertaken with T, corresponding to block 312.

If no scaled clock pulse TTP is generated, that is, no clock pulse of scaled clock cycle TT or no clock pulse of output scaled clock cycle ATT, a specifiable additional manipulation M5 is undertaken with R according to block 303, or with T a further specifiable manipulation M6 is undertaken according to block 310

Consequently, in this example, the scaled clock cycle corresponds to the clock cycle denoted as output clock cycle in the previous example, which in both cases corresponds to the second clock cycle, when input clock cycle ET is assumed to be the first clock cycle. Thus, in addition the possibility arises here of generating an additional third clock cycle based on the second timing, that is, the scaled clock cycle, namely output scaled clock cycle ATT.

As in the previously named example, here too the corresponding variants are possible, as has been described already in connection with FIG. 2. Thus, this means here too, that the clock cycle output either of the scaled clock cycle or the output scaled clock cycle and the change of intermediate value R or scaled intermediate value T may occur, on the one hand, essentially simultaneously or, on the other hand, in an offset manner, particularly offset by clock pulses of the first clock cycle of input clock cycle ET. The same applies to the additional variant that the scaled clock cycle or the output partial timing is always generated, and only the difference with respect to R or T is additionally set.

Figure 5:
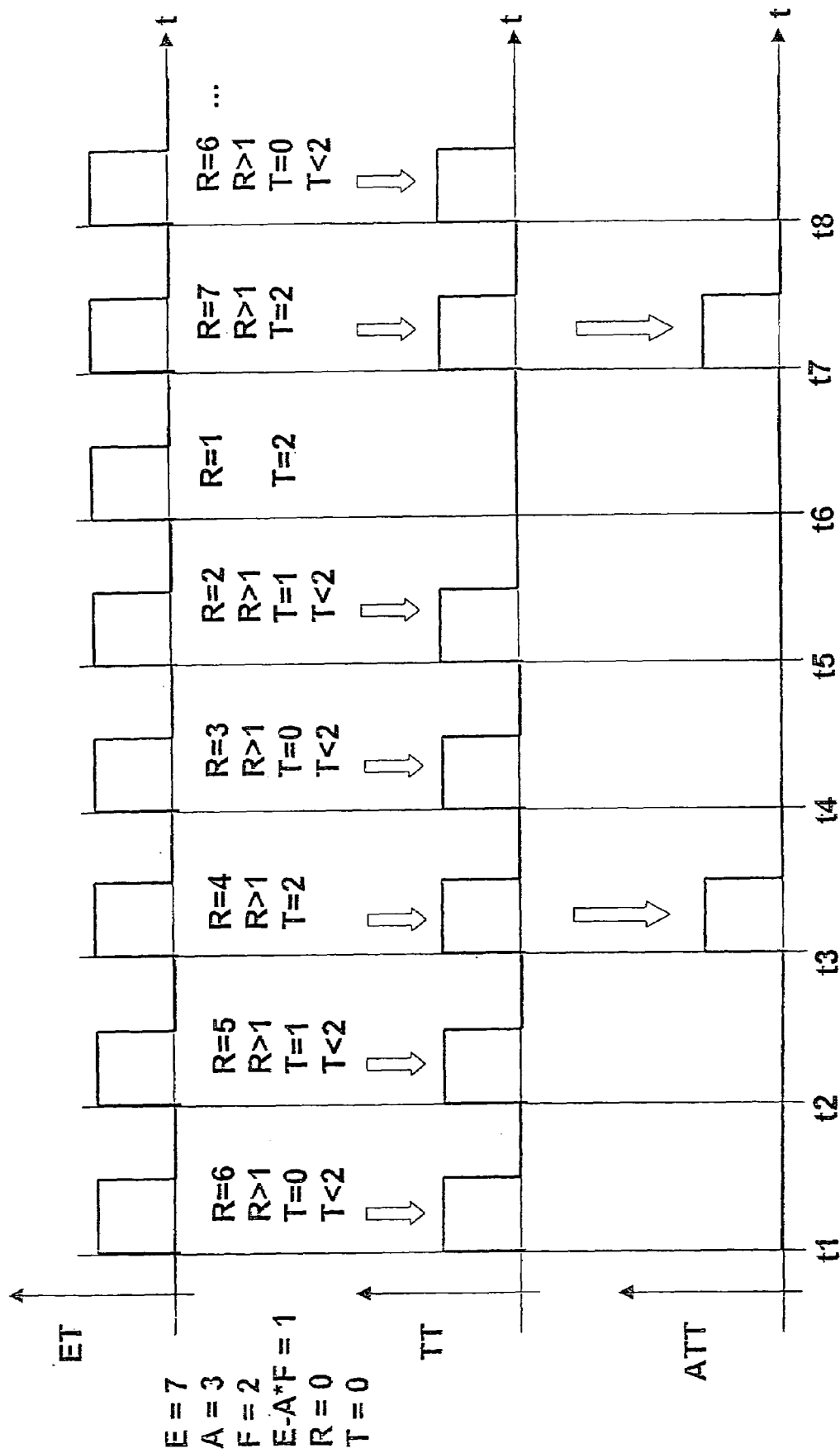
FIG. 5 shows a representation of signals of the clock pulses, to explain the procedures in the flow diagram in FIG. 3.

The continuation according to FIG. 4 will now be explained once more in greater detail in FIG. 5, in a concrete example. The number of input clock cycles E is again 7, and the number of output clock cycles A is again 3, F=2 being selected. This yields E−A*F=1. R and T, in this example, begin at 0. This, again, has the advantage that the values may be written into memories or registers, and when there is a reset, especially a power-on reset, that is, especially after a voltage interruption, the starting values of R and T are present. In the first input clock pulse, R starts at 0, and then the system goes to block 303, and according to equation 12, R=6 is determined for the next clock pulse. At the next run-through, at the next clock pulse, consequently R=6, that is, it is greater than 1. The system reaches block 304, where a scaled clock pulse is generated. At the same time, T continues as 0, and the system reaches block 310, where T is incremented.

Consequently, at the next input clock pulse at T2, R=5>1. The system again reaches block 304 where R is calculated anew to R=4, a scaled clock pulse TT is generated, and since T is still less than 2, this value of T is incremented anew in block 310.

At T=3, the next input clock pulse, consequently R=4 is still greater than 1, and the system reaches block 304. Thereby the next value for R is calculated, R=3, and a scaled clock pulse TT is generated. Now block 309 delivers the truth value FALSEZ, since T=2, which means that T is set to 0 in block 312, and an output scaled clock pulse ATT is generated in block 313. At T=4, R at 3 is still greater than 1. Thus, in block 304 a scaled clock pulse TTP is generated anew, and the next R value is calculated as R=2.

In query 309, T at 0 is less than 2, and is incremented in block 310 to T=1.

At point T5 at the next input clock pulse, consequently, R=2>1. Thus, a scaled clock pulse is generated in block 304, and the next value R=1 is calculated. In block 309, T=1<2 gives truth value TRUEZ, and the system reaches block 310, where T as 1<2 is incremented to 2.

At T6 R=1. Consequently, query 302 yields truth value FALSE, and in block 303 R is calculated to be 7 according to equation 12.

At the next input clock pulse at T7, R=7>1. Thus, in block 304 a scaled clock pulse is generated, and at the same time R is calculated to be 6. In block 309 T=2 yields truth value FALSEZ, and the system reaches block 311. Here, T is set to 0 again in block 312, and in block 313 an output scaled clock pulse ATT is generated.

At T8 the values at T1 are reached again, and the run repeats itself and begins over again.

This shows a method as well as a device, a bus system and a user of the bus system in which the method is able to be carried out, namely in hardware or in software, in order to implement a fractional rational time unit ratio in a simple manner.

The use of the scaler method according to the present invention, for instance in an IC, among other things may be shown on the one hand via the data specification of the IC (the scaler ratio is set as the quotient of two integers) and/or on the other hand by measuring the input clock cycle and the output clock cycle, or rather the functions of the IC controlled by the output clock cycle. In this context, the input clock cycle ET is the first clock cycle from which one starts. From this a second clock cycle is generated, which, in the first example is simply determined using output clock cycle AT and in the second example using scaled clock cycle TT, in the third example, an additional clock cycle, the output scaled clock cycle ATT is output as third clock cycle additionally to, or instead of the second clock cycle, of scaled clock cycle TT.

What is claimed is:

1. A method for forming second clock pulses of a second clock cycle from first clock pulses of a specified first clock cycle in a bus system having at least one user, the method comprising:

determining or specifying a first number of the first clock pulses of the first clock cycle in a specifiable time interval;

determining or specifying a second number of the second clock pulses of the second clock cycle in the specifiable time interval;

specifying an intermediate value of the number of clock pulses in the specifiable time interval;

comparing the intermediate value to a value which is formed from the first number of the first clock pulse and the second number of the second clock pulses, the comparing yielding a truth value of true or false; and generating a clock pulse of the second clock cycle as a function of the truth value;

wherein, besides the intermediate value, a scaled intermediate value is specified which is compared to a specifiable scaled value, and, by comparing to the scaled value an additional truth value of true or false is yielded, a clock pulse of a third clock cycle being generated from the clock pulse of the second clock cycle as a function of the additional truth value.

2. The method of claim 1, wherein the steps are run off once as a function of each clock pulse of the first clock cycle.

3. The method of claim 1, wherein the intermediate value is changed differently, as a function of the comparing and thus as a function of the truth value.

4. The method of claim 3, wherein the generation of the clock pulse of the second clock cycle and the change of the intermediate value by a specifiable number of the first clock pulses of the first clock cycle is performed in an offset manner.

5. The method of claim 1, wherein the value to which the intermediate value is compared is yielded by the relation of $C=E-A*F$, F being an integer.

6. The method of claim 1, wherein a clock pulse of the second clock cycle is generated for each clock pulse of the first clock cycle when the condition of $R>E-A*F$ is satisfied, F being an integer.

7. The method of claim 5, wherein the integer F is limited to values of $2^n$ where n 0 N, and the multiplication $A*F$ is replaced by a shifting of the binary value of A by n bits.

8. The method of claim 1, wherein during generation of third clock pulses of the third clock cycle, the second clock pulses of the second clock cycle are available only in the user, but are not output by it.

9. The method of claim 1, wherein the scaled intermediate value is differently changed as a function of the comparing to the scaled value, and thus as a function of the additional truth value.

10. The method of claim 9, wherein generation of third clock pulses of a third clock cycle and the change of the scaled intermediate value by a specifiable number of the first or second clock pulses of the first clock cycle or the second clock cycle is performed in an offset manner.

11. A device in a bus system for forming second clock pulses of a second clock cycle from first clock pulses of a specified first clock cycle in a bus system having at least one user, the device comprising:
   a first determining arrangement to determine or specify a first number of the first clock pulses of the first clock cycle in a specifiable time interval;
   a second determining arrangement to determine or specify a second number of the second clock pulses of the second clock cycle in the specifiable time interval;
   a specifying arrangement to specify an intermediate value of the number of clock pulses in the specifiable time interval;
   a comparing arrangement to compare the intermediate value to a value which is formed from the first number of the first clock pulses and the second number of the second clock pulses, the comparing yielding a truth value of true or false; and
   a generating arrangement to generate a clock pulse of the second clock cycle as a function of the truth value;
   wherein, besides the intermediate value, a scaled intermediate value is specified which is compared to a specifiable scaled value, and, by comparing to the scaled value an additional truth value of true or false is yielded, a clock pulse of a third clock cycle being generated from the clock pulse of the second clock cycle as a function of the additional truth value.

12. A bus system comprising:
   at least one user having a device for forming second clock pulses of a second clock cycle from first clock pulses of a specified first clock cycle in the bus system, the bus system having at least one user, the device including:
      a first determining arrangement to determine or specify a first number of the first clock pulses of the first clock cycle in a specifiable time interval;
      a second determining arrangement to determine or specify a second number of the second clock pulses of the second clock cycle in the specifiable time interval;
      a specifying arrangement to specify an intermediate value of the number of clock pulses in the specifiable time interval;
      a comparing arrangement to compare the intermediate value to a value which is formed from the first number of the first clock pulses and the second number of the second clock pulses, the comparing yielding a truth value of true or false; and
   a generating arrangement to generate a clock pulse of the second clock cycle as a function of the truth value;
   wherein, besides the intermediate value, a scaled intermediate value is specified which is compared to a specifiable scaled value, and, by comparing to the scaled value an additional truth value of true or false is yielded, a clock pulse of a third clock cycle being generated from the clock pulse of the second clock cycle as a function of the additional truth value.

13. A user in a bus system, comprising:
   a device for forming second clock pulses of a second clock cycle from first clock pulses of a specified first clock cycle in the bus system, the device including:
      a first determining arrangement to determine or specify a first number of the first clock pulses of the first clock cycle in a specifiable time interval;
      a second determining arrangement to determine or specify a second number of the second clock pulses of the second clock cycle in the specifiable time interval;
      a specifying arrangement to specify an intermediate value of the number of clock pulses in the specifiable time interval;
      a comparing arrangement to compare the intermediate value to a value which is formed from the first number of the first clock pulses and the second number of the second clock pulses, the comparing yielding a truth value of true or false; and
   a generating arrangement to generate a clock pulse of the second clock cycle as a function of the truth value;
   wherein, besides the intermediate value, a scaled intermediate value is specified which is compared to a specifiable scaled value, and, by comparing to the scaled value an additional truth value of true or false is yielded, a clock pulse of a third clock cycle being generated from the clock pulse of the second clock cycle as a function of the additional truth value.

* * * * *